United States Patent

Chen et al.

[11] Patent Number: 6,069,200
[45] Date of Patent: May 30, 2000

[54] AQUEOUS SILYLATED POLYMER CURABLE COMPOSITIONS

[75] Inventors: Ming J. Chen, Garnerville; Frederick D. Osterholtz, Pleasantville, both of N.Y.

[73] Assignee: CK Witco Corporation

[21] Appl. No.: 08/935,003

[22] Filed: Sep. 22, 1997

Related U.S. Application Data

[63] Continuation of application No. 08/549,194, Oct. 27, 1995, abandoned, which is a continuation-in-part of application No. 08/452,163, May 26, 1995, Pat. No. 5,621,038.

[51] Int. Cl.$^7$ .................................................. C08L 43/00
[52] U.S. Cl. ..................... 524/547; 524/504; 524/521; 524/837; 525/326.5
[58] Field of Search .................................. 524/547, 837, 524/504, 521; 525/326.5

[56] References Cited

U.S. PATENT DOCUMENTS

| | | |
|---|---|---|
| 3,449,293 | 6/1969 | Burzynski et al. . |
| 3,499,870 | 3/1970 | Hadlock et al. . |
| 3,629,214 | 12/1971 | Buning et al. . |
| 3,706,697 | 12/1972 | Backderf . |
| 3,729,438 | 4/1973 | Plesich et al. . |
| 3,755,252 | 8/1973 | Buning et al. . |
| 3,814,716 | 6/1974 | Plesich et al. . |
| 3,821,174 | 6/1974 | Buning . |
| 4,049,869 | 9/1977 | De Long . |
| 4,062,451 | 12/1977 | Gander . |
| 4,309,326 | 1/1982 | Sage et al. . |
| 4,394,418 | 7/1983 | Temple . |
| 4,399,247 | 8/1983 | Ona et al. . |
| 4,526,930 | 7/1985 | Keogh . |
| 4,684,697 | 8/1987 | Chang et al. . |
| 4,687,818 | 8/1987 | Kawakubo et al. . |
| 4,716,194 | 12/1987 | Walker et al. . |
| 4,719,194 | 1/1988 | Cietek et al. . |
| 4,778,624 | 10/1988 | Ohashi et al. . |
| 4,788,254 | 11/1988 | Kawakubo et al. . |
| 4,818,779 | 4/1989 | Witucki et al. . |
| 4,877,654 | 10/1989 | Wilson . |
| 4,889,747 | 12/1989 | Wilson . |
| 5,017,632 | 5/1991 | Bredow et al. . |
| 5,100,955 | 3/1992 | Pons et al. . |
| 5,196,054 | 3/1993 | Schmuck et al. . |
| 5,226,954 | 7/1993 | Suzuki . |
| 5,385,955 | 1/1995 | Tarshiani et al. . |

FOREIGN PATENT DOCUMENTS

| | | |
|---|---|---|
| 2093606 | 10/1993 | Canada . |
| 0401496 | 4/1990 | European Pat. Off. . |
| 625502 | 2/1994 | Japan . |

OTHER PUBLICATIONS

Chemical Abstract No. 86,18947; 1976.
Chemical Abstract No. 74,96730; 1971.
Chemical Abstract No. 05,140,502; 1993.
Chemical Abstract No. 730,900; 1980
Bourne, T.R., Bufkin, B.G., Wildman, G.C., Grawe, J.R.; Feasibility of Using Alkoxysilane–Functional Monomers; Univ. Of Mississippi; 1982.
Lutz, M.A., Polmanteer, K.E.; Methyltrimethoxysilane Modification of Organic Latexes; Dow Corning Corp; 1979.

*Primary Examiner*—Judy M. Reddick
*Attorney, Agent, or Firm*—Edward K. Welch, II

[57] ABSTRACT

Curable compositions comprising stable, water dispersible, curable polymers containing sterically hindered alkoxylated silane groups and acid groups blocked by fugitive bases at 0.1 to 75 weight percent of the total composition and water at 99.9 to 25 weight percent of the total composition are taught herein, as well as methods for the use and manufacture thereof. Additional components, such as emulsifiers, buffers and thickeners are also taught. These compositions are useful as adhesives, sealants and paints. The compositions have improved properties including solvent resistance, adhesion, hardness, abrasion resistance and mar resistance.

17 Claims, No Drawings

AQUEOUS SILYLATED POLYMER CURABLE COMPOSITIONS

This application is a continuation of application Ser. No. 08/549,194 filed Oct. 27, 1995 which application is now abandoned; which is a continuation-in-part of U.S. application Ser. No. 08/452,163 filed May 26, 1995 U.S. Pat. No. 5,621,038.

BACKGROUND OF THE INVENTION

Water-curable compositions based on thermoplastic polymers having hydrolyzable silane moieties are becoming increasingly interesting as environmental, health and safety concerns increase for other curing technologies. Such compositions have excellent properties of weather-, chemical- and water-resistance, since the alkoxysilyl group is connected to the polymer chain by a carbon-silicon bond, rather than a labile carbon-oxygen-silicon linkage; therefore water-, alkali- and acid-resistance are remarkably improved compared to a system with silicates or silanes added by physical mixing. One disadvantage of water-curable silylated polymer compositions, however, is that they tend to crosslink, especially if dispersed in water, under normal conditions of preparation, handling and storage. As a result, the relatively poor shelf life of such compositions has tended to limit their wide commercial acceptance and has kept the use of silylated polymers to those with very low silane concentrations, typically less than 1.0 weight percent, in waterborne polymeric products.

Modification of water-curable compositions to alleviate the problem of premature crosslinking is described in U.S. Pat. No. 4,526,930 which teaches relatively water-stable, melt-processable, thermoplastic polymers with hydrolyzable silane moieties. These silylated polymers are only activated or made readily water-curable by the reaction therewith of an organotitanate having at least one readily hydrolyzable group, which ester exchanges with an ester group of the silane.

Unexamined Japanese Patent Application No. 6025502 teaches a composition comprising a polymer emulsion obtained by adding a tin catalyst (a diorganotin carboxylate) which is insoluble in water, to silylated vinyl polymers after emulsion polymerization. The addition of a water insoluble tin catalyst, however, is not suitable for such films because defects result from the heterogeneous catalysts and the emulsion polymer mixtures, such as formation of craters and granular particles on the surface and uneven crosslinkage in the film structure. Moreover, the silanes taught therein have alkoxy groups at least eight carbons long and generally of a straight chain structure.

This Japanese patent application also teaches non-discriminate curing catalysts generally used for silane/ester hydrolysis and condensation reactions. Similar examples of catalysts for silane ester and silanol-containing compositions can be found in the literature, which disclose catalysts dissolved in organic solvent-based systems to ensure a proper cure.

Thus, it is clear that there is the need for one component, water-based dispersed silylated polymeric systems that have good stability during storage in water and which produce films of good quality upon application and drying.

SUMMARY OF THE INVENTION

The present invention provides compositions and methods of preparing and methods of using water dispersible or emulsifiable, curable polymers having at least one alkoxy silane hydrolyzable group and an acid blocked with a fugitive base and which clearly meet the challenges of the above problems. The present invention relates to the compositions and methods of making compositions of silylated polymers, curable by blocked internal acids, and which have good stability during storage in water. These compositions may also include other catalysts, water and optionally, some other ingredients. The compositions may be used in coatings, adhesive and sealants.

Said compositions have shelf lives of at least twelve months. More preferably, these compositions have shelf lives of at least 24 months.

DETAILED DESCRIPTION OF THE INVENTION

The curable, aqueous compositions of the present invention comprise: (I) a stable, water dispersible or emulsifiable, curable polymer at 0.1 to 75 weight percent of the total composition containing a sterically hindered alkoxylated silane group and a copolymerized or grafted acid which is blocked with a fugitive base; (II) water at 99.9 to 25.0 weight percent; and optionally, (III) other ingredients.

(I) Polymer

Polymers for use herein are water dispersible or emulsifiable, curable polymers which have pendant and/or terminal silyl ester groups (i.e., alkoxy silane) and pendant or terminal acidic groups neutralized with fugitive base(s) thereon, where at least some of the pendant and/or terminal silyl ester groups are silanes which are sterically hindered. The steric hindrance of the silyl ester prevents hydrolysis of the silane ester and allows for longer shelf-life. Moreover, the release of fugitive bases(s) upon application of the present compositions frees the acid for catalyzing the cure of the polymer. The silane monomer portion of the polymer should be present at 0.1 to 50 mole percent of the monomers used to form the polymer. Varying the amount of silane in the polymer affects the performance properties of the composition. The acid monomers should be present at 0.1 to 10 molar percent of the monomers. The polymers should have molecular weights of between one thousand and three million.

The polymers of the present invention have an acid preferably in the form of a carboxylic group which are terminal or pendant. Examples of reactive polymers which can be used in the present invention include carboxylic acid modified polymers chosen from the following: polyethylene, polypropylene, polyethylene propylene copolymer, urethanes, epoxies, polystyrenes and urethane acrylic polymers. Also useful herein are acrylic homopolymers, vinyl acrylic polymers, methacrylic polymers, styrene acrylic copolymers, and polyesters. These reactive polymers may also contain other organic functional groups, including hydroxyl, amide, vinyl and halogens are contemplated as being within the scope of reactive polymers.

The acidic groups bound to the polymer chain may be provided by copolymerized or grafted species. Acrylic and methacrylic acids are used commonly in vinyl and acrylic polymers. Maleic and fumaric acids, itaconic acid, sulfonic acids and others may also be used. The fugitive bases which may be used to block the acid groups are fugitive in the sense that greater than fifty weight percent of the total amount of base in the composition should evaporate from the composition in one day at ambient temperature after it is applied as a 2 mil thick film. Examples of such bases include ammonia, organic amines, such as morpholine, diethanolamine, amino alcohols (including AMP from Angus Chemicals) and similar compounds. Different amines may be used to neutralize the acid functionalities, which neutralization is achieved when enough base is added to bring the composition to a pH of about 5.5 to 8.5. The fugitive base may be added to the polymer prior to or after the polymer has been placed in water by simple addition of the base with low shear stirring, though it is preferred that the base be placed in solution only after the polymer has been formed.

Illustrative examples of monomeric organofunctional silanes for incorporation into the polymer when free radical addition polymerization is used include acrylatoalkylalkoxysilanes, methacrylatoalkylalkoxysilanes or vinyl alkoxysilane monomers, such as 3-methacryloxypropyltri-iso-propoxysilane, 3-methacryloxypropyltri-iso-butoxysilane, 3-methacryloxypropyltrioctoxysilane, vinyltri-iso-butoxysilane, vinyl tri-n-decoxysilane and vinyltri-tert-butoxysilane. Other polymerizable silanes, such as maleate functional silanes, may be used. Silyl-terminated polymers are formed by reacting chain transfer agents, such as 3-mercaptopropyl tri-iso-butoxysilane.

Illustrative examples of monomeric organofunctional silanes for incorporation into the polymer when the polymer is formed by condensation polymerization include 3-aminopropyltri-iso-propoxy silane, N-(2-aminoethyl)-3-aminopropyidi-iso-butoxy silane, 4-mercaptobutyldimethyloctyloxysilane, 3-isocyanatopropyltri-sec-butoxysilane, and 3-glycidoxypropylmethyldipentoxysilane. Polymers that are formed by condensation polymerization include polyurethanes, epoxies, polyesters, vinyl esters, polyureas, polyamides and similar types of polymers.

The silanes may be grafted or end-capped onto an existing polymer or may be a co-monomer in the production of the polymer. The silane group is most commonly attached to the polymer through an alkylene group.

Further, the pendant and/or terminal silane group of the polymer may be represented by the structure $R^2_a(R^1O)_{3-a}SiR^3$ where $R^1$ is a sterically hindered $C_3$ to $C_{10}$ alkyl group in straight or branched chain configuration; $R^2$ is a monovalent hydrocarbon group having from one to ten carbon atoms; $R^3$ is an alkylene, arylene, aralkylene group or the polymer backbone itself, with the proviso that the $SiR^3$ is bound to the polymer through an Si—C bond; and "a" has a value of zero, one or two.

Illustrative of suitable sterically-hindered, straight chain hydrocarbon radicals for use as $R^1$ in the formula set forth above are n-butyl, n-pentyl n-hexyl, n-heptyl, n-octyl, n-nonyl, n-decyl and the like, and cyclo-radicals such as cyclopentyl, cyclohexyl, cycloheptyl, cyclooctyl, bicycloheptyl, and the like. Illustrative of suitable branched chain hydrocarbon radicals for $R^1$ are alkyl radicals such as iso-octyl, 3-methyl pentyl, 2,5-dimethylhexyl, 4-methyl-2-pentyl and the like. The most preferable $R^1$ are sterically hindered groups of less than five carbons, and more preferably less than four carbons, such as iso-propyl, sec-butyl, and iso-butyl.

$R^2$ is a monovalent hydrocarbon having from one to ten carbon atoms, for example, an alkyl group (e.g., methyl, ethyl, propyl, octyl or decyl) or an aryl group (e.g., tolyl or phenyl) or aralkyl (e.g., benzyl, phenethyl or tolyl). $R^3$ is the group that links the silane pendant or terminal group to the polymeric backbone and may be a straight or branched alkyl group, aralkyl group or aryl group, generally has about from 1 to 18 carbons and may have substituents thereon or may be the polymer itself. The $R^3$ groups bonds the silicon atom to the polymer through a silicon carbon covalent bond, which provides hydrolytic and thermal stability to the silylated polymer. Substituents to the $R^3$ group may include a replacement for a carbon atom with atoms such as oxygen, nitrogen or sulfur, with the proviso that the carbon atom adjacent to the silicon is not replaced. Other substituents include replacement of the hydrogen atom attached to carbon with halogen atoms, nitrogen, sulfur, oxygen, and organofunctional groups, such as cyano, urea, esters, amides, oxo and the like.

The polymers may be prepared by any polymerization technique known in the art, such as, suspension polymerization, interfacial polymerization, solution polymerization or emulsion polymerization. Emulsion polymerization of ethylenically unsaturated monomers in the presence of certain surfactants is the preferred polymerization technique for vinyl and acrylic polymers because the aqueous dispersion of latex polymer particles so formed can be used directly or with minimal work-up in preparing the aqueous compositions of the present invention. These polymerizations may be conducted as is well known in the art. The polymers may also be prepared by grafting techniques known in the art, such as free radical grafting of ethylenic containing sterically hindered silanes or acids to polyolefinic polymers. It is preferred that the polymer be made such that there is a gradient of silane concentration in the polymer, commencing with a high silane concentration in the center core of the dispersion particles and moving towards a lower silane concentration at the outer "shell" to provide for better stability of the polymer.

Polymers suitable for dispersing in water usually incorporate solubilizing groups, such as nonionic or anionic groups. Nonionic groups include hydroxyl, carboxyl, polyalkylene oxide and the like. Anionic groups include salts of sulfates, phosphates, carboxylates and the like. Combinations of the above solubilizing groups of nonionic with anionic groups may be used. Polymer dispersions may be prepared by techniques well known in the art. However, it is important that the polymer still contains acidic groups that are neutralized with fugitive bases, which can provide catalysis for crosslinking after the fugitive base evaporates.

Emulsions of polymers that contain a silyl group with sterically hindered alkoxy groups can be prepared by using emulsifiers and techniques well known in the art. Suitable emulsifiers are set forth below.

The stable, water dispersible or emulsifiable, curable polymer containing a sterically hindered alkoxylated silane group and acid group blocked or neutralized with a fugitive base should be present at 0.1 to 75 percent by weight of the total composition.

(II) Water

Water should be present at 99.9 to 25.0 weight percent of the composition.

(III) Other Ingredients

In addition to the internal acid, other water soluble or emulsifiable curing catalysts may be used to cure the polymers. Suitable catalysts for use herein are hydrolytically stable, water emulsifiable or water soluble organometallic catalysts, such as hydrolytically stable organotitanate, organotin, chelated titanium, aluminum and zirconium compounds, and combinations thereof. Usually they are not required for adequate cure rates.

The preferred pH range of the present aqueous compositions is about 5.5 to 8.5, with most preferred being 7.0 to ensure blocking of the acid groups. Thus, a small amount of a buffer may be used. Any conventional buffering agent or mixtures of such agents known in the art can be employed, such as sodium acetate and sodium bicarbonate. The buffer should be present at about 1.0 parts by weight or less based on 100 parts by weight of polymer.

Furthermore, the compositions of the present invention may include an appropriate amount of thickeners (such as carboxymethylcellulose, methylcellulose, hydroxyethylcellulose, polyvinyl alcohol, polyacrylic acid), fillers, pigments, dyes, heat-stabilizing agents, preservatives, and penetrants (such as aqueous ammonia) and other common additives. In addition, commercially available water-based polymer dispersions can be blended with the water-dispersible compositions of the present invention, provided that they do not cause instability. Examples include conventionally known waterborne acrylics, cellulosics, aminoplasts, urethanes, polyesters, alkyds, epoxy systems, silicones or mixtures thereof.

The polymer may be added to water as an emulsion or dispersion. If the polymer is an emulsion, some amount of emulsifier will be required. The emulsifiers for use herein include nonionic, anionic and cationic surfactants or mixtures of nonionic with anionic or cationic surfactants. Examples of the nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Examples of the anionic surfactants include fatty acid salts, alkyl sulfate ester salts, alkyl benzene sulfonate, alkyl phosphate, alkylallyl sulfate ester salt, and polyoxyethylene alkylphosphate ester. Examples of the cationic surfactants include quaternary ammonium salts such as long chain alkyl trimethylammonium salts, long chain alkyl benzyl dimethyl ammonium salts, and di(long chain alkyl) dimethyl ammonium salts. A further listing of surfactants useful in the present invention may be those described in 1994 McCutcheon's *Vol. 1: Emulsifiers and Detergents*, North American Edition (The Manufacturing Confectioner Publishing Co., Glen Rock) 1994, which is incorporated herein by reference. The nonionic surfactants are preferred.

The emulsifier(s) should be present in the range of 0.05 to 30 weight percent based on weight of polymer and preferably 0.2 to 20 weight percent of the polymer composition.

The appropriate HLB (hydrophilic-lipophilic balance) of the surfactants is chosen to correspond to the HLB of the specific silylated polymer being emulsified. The method for selecting the optimum HLB for a substance is well known to one skilled in the art and described in "The HLB System" by ICI Americas Inc.

The optional ingredients may be added at any time, although in most cases, the catalyst should be added last.

METHOD OF MANUFACTURE

The compositions of the present invention are prepared by adding the silylated polymer to water, along with any optional ingredients. The method employed to mix these components is not critical and any commonly used low shear equipment, such as a blade or paddle mixer, is suitable.

USE/ADVANTAGE

The compositions do not seed or gel over an twelve month period of room temperature storage. More preferably compositions have a shelf life of at least twenty-four months.

The present invention solves the problems of the prior art by using internal acid functional groups that are prevented from catalyzing the cure of the polymer while neutralized with a fugitive base. Upon application of the composition, the fugitive base evaporates and the pH drops to a more acidic value which then catalyzes the hydrolysis and condensation of the silane. Most acidic groups should be blocked to provide a pH in the range 7±1.5, however, there may be free acid groups in limited quantities remaining, though preferably less than 10% of the total carboxyl groups on a molar basis so long as the free acid groups do not lower the pH sufficiently to catalyze hydrolysis.

The compositions of the present invention are intended to be cured upon use. They may be cured at a range of temperatures, including ambient cure or elevated temperature cure. Such curing may be accomplished by standard means in the art.

It is possible to use the compositions for various purposes, e.g., paints, adhesives, coating materials, binders and sealants, and take advantage of the above excellent characteristics of compositions of the present invention. The cured compositions form a coating having excellent gloss, solvent resistance, adhesion, hardness, abrasion resistance and mar resistance. The compositions of this invention are film forming and are useful for forming protective and/or water repellent coatings on a variety of substrates, such as metal, wood, textiles, leather, and ceramics. A composition according to the present invention, depending on the presence of pigments or other conventional components, may be used as a basecoat, clearcoat, print paste binder, sizing, coating or primer. Cured films having superior transparency and solvent resistance may be formed with no surface defects. Washing resistant coatings may be created.

MEK double rub tests, gel content and flow property tests of the latex films illustrate the enhanced siloxane crosslinking effected by the catalysts used in the present invention. Cured compositions made according to the present invention have an MEK rub resistance (performed according to ASTM D 4752-87) of at least 20 and preferably at least 40 after curing under mild conditions and for short periods of time. The cured compositions have improved adhesion performance according the crosscut tape adhesion test, ASTM 3359-90, of 4B or greater.

EXAMPLES

The following Examples are given to facilitate the understanding of this invention without any intention of limiting the invention thereto. All percentages in these Examples are by weight.

Example 1

Synthesis of Silylated Acrylic Latex A

Into a one liter reaction vessel equipped with a stirrer, thermometer, dropping funnel and nitrogen gas inlet were charged deionized water (100 g) and IGEPAL CA-897 surfactant (44 g) available from Rhone-Poulenc. A mixture of deionized water (379.4 g), butyl acrylate (55.0 g), methyl methacrylate (120.8 g), methacrylic acid (2.8 g), 3-methacryloxypropyltri-isopropoxy silane (41.8 g), aqueous 0.15% ferrous sulfate solution (6.0 g) and potassium persulfate (3.0 g) were added at ambient temperature and mixed for five minutes. A 2% aqueous solution of sodium formaldehyde sulfoxylate (12.0 g) was added to the mixture. The reaction mixture exothermed from ambient temperature to about 60° C. and then the reaction was cooled to 35° C. A second mixture of butyl acrylate (65.0 g), methyl methacrylate (121.4 g), methacrylic acid (2.8 g) and 3-methacryloxypropyltri-isopropoxy silane (27.8 g) was added to the reaction vessel and the mixture was allowed to heat to about 60° C. and then was cooled to 50° C. t-Butyl hydroperoxide-70 (0.1 g) was slowly added to the reaction mixture followed by a 2% sodium formaldehyde sulfoxylate solution (6.0 g). The reaction mixture was stirred and then cooled to room temperature. Concentrated NH$_4$OH solution was used to block the acid groups and adjust the pH of the silylated polymer emulsion to 7.5. The silylated polymer emulsion was then strained to remove solid particles.

Example 2
Synthesis of Silylated Acrylic Latex B

Into a one liter reaction vessel equipped with a stirrer, thermometer, dropping funnel and nitrogen gas inlet were charged deionized water (499.4 g) and IGEPAL CA-897 surfactant (44 g) available from Rhone-Poulenc. The system was heated to 65° C. Aqueous 0.15% ferrous sulfate solution (6.0 g) and potassium persulfate (3.0 g) was added at ambient temperature and mixed for five minutes. In another flask butyl acrylate (120.0 g), methyl methacrylate (242.2 g), methacrylic acid (5.6 g) and vinyltriisopropoxy silane (49.6 g) were mixed. Part of this mixture (41.74 g) and a 2% sodium formaldehyde sulfoxylate solution (3.0 g) were added and stirred for 15 minutes at 65° C. The remaining mixture (375.6 g) and 2% sodium formaldehyde sulfoxylate solution (21.0 g) were separately fed into the one liter reaction vessel over a period of three hours while maintaining the reaction temperature at 65° C. t-Butyl hydroperoxide-70 (0.1 g) and a 2% sodium formaldehyde sulfoxylate solution (6.0 g) was added to the vessel as it was stirred for one hour to complete the polymerization reaction and then cooled to room temperature. Concentrated $NH_4OH$ solution was used to block the acid group adjust the pH of the silylated polymer emulsion to 7.5. The silylated polymer emulsion was strained to remove any solid particles.

Comparative Example 1
Synthesis of Acrylic Latex X Containing no Hindered Silyl Groups Into a one liter reaction vessel equipped with a stirrer, thermometer, dropping funnel and nitrogen gas inlet were charged deionized water (521.6 g), GEPAL CA-897 surfactant (44 g) available from Rhone-Poulenc, butyl acrylate (73.7 g), methyl methacrylate (121.1 g), methacrylic acid (2.8 g), aqueous 0.15% ferrous sulfate solution (6.0 g) and potassium persulfate (3.0 g) at ambient temperature and mixed for five minutes. A 2% aqueous solution of sodium formaldehyde sulfoxylate (12.0 g) was added. The reaction mixture exothermed and then was cooled to 35° C. A second mixture of butyl acrylate (73.7 g), methyl methacrylate (121.1 g) and methacrylic acid (2.8 g) was added to the reaction vessel followed by the addition of a 2% sodium formaldehyde sulfoxylate solution (12.0 g). The reaction mixture was allowed to exotherm to about 60° C. and then cooled to 50° C. t-Butyl hydroperoxide-70 (0.1 g) and a 2% sodium formaldehyde sulfoxylate solution (6.0 g) was added to the vessel as it was stirred for one hour to complete the polymerization reaction and then cooled to room temperature. Concentrated ammonium hydroxide solution was used to block the acid groups and adjust the pH of the silylated polymer emulsion to 7.5. The silylated polymer emulsion was strained to remove any solid particles.

Comparative Example II
Synthesis of Silylated Vinyl Acrylic Latex Y Containing no Acid Functional Groups A latex was produced by a semicontinuous batch process from deionized water (419.5 g), IGEPAL CA-897 surfactant (26.5 g), IGEPAL CA-630 surfactant (3.0 g), sodium bicarbonate (2 g) and NATROSOL 250 MXR (2.5 g) were charged into a one liter reactor equipped with an overhead condenser and a metal-bladed stirrer. The system was heated to 65° C. with a heating mantle and purged with nitrogen. Ammonium persulfate (1.8 g) and ABEX EP-110 anionic surfactant from Rhone-Poulenc (3.8 g) were added. Ten percent of a monomer mixture (prepared by pre-mixing vinyl acetate (385 g), butylacrylate (65 g) and 3-methacryloxypropyltriisopropoxysilane (66 g) was then added in less than 1 minute. The temperature was maintained below 75° C. and stirred for 15 minutes at 150 rpm. After the seed latex was made by this batch process, the remaining 90% of the monomer mixture was added over a three hour period at a rate that permitted the heat of reaction to be removed and the reaction temperature maintained at 75° C. When the monomer mixture had been completely added, the emulsion was held at 75° C. for 30 minutes and t-butyl hydroperoxide-70 (0.1g) was added. 2% Sodium formaldehyde sulfoxylate solution (25 g) was added over a period of one hour while maintaining the temperature at 75° C. After completion of the reaction, the pH of the reaction solution was adjusted to 7.5 by adding a 5% $NH_4OH$ solution.

TESTING OF EXAMPLES (Examples 3–6 and Comparative Examples III–VI)

Films were prepared by casting the polymer compositions set forth above using a draw down bar onto phosphated stainless steel panels. The dry film thickness was 2 mils [50.8 $\mu$m]. The films were cured at 23° C. and 50% relative humidity for seven days. The solvent resistance of the films was determined by MEK double rubs, as described in ASTM D 4752-87. Gloss values were performed according to ASTM D 523. Pencil hardness was performed according to ASTM D3363-74 (reapproved 1989). The crosscut tape adhesion test was performed according to ASTM 3359-90.

The effectiveness of the curing catalysts in promoting the crosslinking of the polymer containing sterically hindered alkoxysilyl groups is demonstrated by the gel content of films. The gel content was determined by pouring compositions of the present invention or comparative examples into a petri dish and allowing them to cure at room temperature for ten days. One gram of the dried (cured) film was removed and divided into small rectangular pieces which were weighed ($w_1$), placed into a cellulosic thimble and extracted with methyl ethyl ketone (MEK) solvent for twelve hours under nitrogen atmosphere using a Soxhlet extractor. After extraction, the sample remaining in the thimble was dried and the remaining sample was weighed ($w_2$). The gel content was determined by the equation:

$$\text{Gel content } (\%) = [[1-(w_1-w_2)]/w_1] \times 100,$$

where $w_1$ and $w_2$ are as above.

TABLE I

FILM PROPERTIES OF COMPOSITIONS OF PRESENT INVENTION AND COMPARATIVE EXAMPLES

| Example No. | Polymer | Catalyst[1] | Gloss (60°) | Hardness | Tape Adhesion | MEK Rub | Gel Content, % |
|---|---|---|---|---|---|---|---|
| 3 | A | No | 85 | F | 5B | >400 | 89 |
| 4 | A | Yes | 83 | H | 5B | >400 | 91 |
| 5 | B | No | 88 | 2H | 5B | >400 | 92 |
| 6 | B | Yes | 87 | 2H | 5B | >400 | 89 |
| Comparative Examples | | | | | | | |
| III | X | No | 84 | B | 5B | 10 | 0[2] |
| IV | X | Yes | 83 | HB | 5B | 30 | 0[2] |
| V | Y | No | 85 | 5B | 5B | 22 | 13.1 |

TABLE I-continued

FILM PROPERTIES OF COMPOSITIONS OF PRESENT INVENTION AND COMPARATIVE EXAMPLES

| Example No. | Polymer | Catalyst[1] | Gloss (60°) | Hardness | Tape Adhesion | MEK Rub | Gel Content, % |
|---|---|---|---|---|---|---|---|
| VI | Y | Yes | 85 | 2B | 5B | 38 | 25.4 |

[1]TYZOR 131 catalyst (E. I. DuPont de Nemours, & Co.) added at 5 weight percent of composition.
[2]These films were soluble in MEK and so the gel content reads as 0.

The effectiveness of the internal acid catalysts of the compositions of the present invention is illustrated by the gel content of the cured films. Examples 3 and 5 have gel contents of 89 and 92 percent, respectively. These high gel contents indicated that the sterically hindered triisopropoxy silyl groups of the polymer have hydrolyzed and condensed to crosslink or cure the polymers. Comparative Example V, a vinylacrylic polymer containing triisopropoxy silyl groups, but no internal acid catalyst, has a gel content of only 13.1 percent. Even addition of high levels of titanium curing catalyst, TYZOR 131, did not achieve the same degree of cure. The gel content of Comparative Example VI was only 25.4 percent.

The internal acid catalysts were effective in achieving the complete cure of the films. For example, the addition of five weight percent titanium catalyst to silylated acrylics A and B, as shown in Examples 4 and 6, did not significantly increase the gel content of the cured films from that achieved when no catalyst was used, as in Examples 3 and 5. The gel contents for Examples 3 through 6 were between 89 and 92 percent.

Incorporation of the internal catalyst significantly improved the properties of the cured films, such as solvent resistance and hardness. The MEK double rubs of examples 3 through 6 greater than 400. A polymer containing no silyl groups had very poor solvent resistance, as shown by Comparative Examples III and IV, which had only 10 and 30 MEK double rubs, respectively. The solvent resistance of silylated polymers not containing the internal cure was also poor. The MEK double rubs of Comparative Examples V and VI were 22 and 38, respectively.

We claim:

1. A curable composition comprising:
   (a) a stable, water dispersible or emulsifiable, curable polymer at 0.1 to 75 weight percent of the total composition containing a sterically hindered alkoxylated silane group and acid groups blocked with a fugitive base, wherein the silane group is of the structure $R^3SiR^2_a(OR^1)_{3-a}$, where $R^1$ is a sterically hindered $C_3$ to $C_5$ alkyl group in branched configuration; $R^2$ is a monovalent hydrocarbon group having from one to ten carbon atoms; $R^3$ is an alkylene, arylene, aralkylene group or the polymer backbone itself, with the proviso that the $SiR^3$ is bound to the polymer through an Si—C bond; and "a" has a value of zero, one or two; and
   (b) water at 99.9 to 25 weight percent of the total composition.

2. A composition according to claim 1 additionally comprising a buffer in an amount sufficient to maintain the pH of the composition at between 5.5 and 8.5.

3. A film produced by curing of the composition of claim 1.

4. A composition according to claim 1 wherein $R^1$ is selected from the group consisting of: iso-butyl, sec-butyl, iso-propyl, iso-amyl and sec-amyl.

5. A composition according to claim 1 wherein the blocked acid groups are terminal or pendant carboxyl groups.

6. A composition according to claim 1 wherein the acid is present at 0.1 to 10 mole percent of the polymer.

7. A composition according to claim 1 wherein the fugitive base is selected from the group consisting of: ammonia, morpholine, diethanolamine, and amino alcohols.

8. A composition according to claim 1 wherein the fugitive base is present at a level so that less than ten percent of the acid groups on the polymer are not blocked.

9. A process making a curable composition comprising mixing:
   (a) a stable, water dispersable or emulsifiable, curable polymer at 0.1 to 75 weight percent of the total composition containing a sterically hindered alkoxylated silane group and acid groups blocked with a fugitive base, wherein the silane group is of the structure $R^3SiR^2_a(OR^1)_{3-a}$, where $R^1$ is a sterically hindered $C_3$ to $C_5$ branched alkyl group; $R^2$ is a monovalent hydrocarbon group having from one to ten carbon atoms; $R^3$ is an alkylene, arylene, aralkylene group or the polymer backbone itself, with the proviso that the $SiR^3$ is bound to the polymer through an Si—C bond; and "a" has a value of zero, one or two; and
   (b) water at 99.9 to 25 weight percent.

10. A process according to claim 9 wherein the curable composition has a shelf life of at least twelve months.

11. A process according to claim 9 additionally comprising adding buffer in an amount sufficient to maintain the pH of the composition at between 5.5 and 8.5.

12. A process according to claim 9 additionally comprising curing the curable composition.

13. A process according to claim 9 wherein $R^1$ is selected from the group consisting of: iso-butyl, sec-butyl, iso-propyl and sec-amyl.

14. A process according to claim 9 wherein the blocked acid groups are terminal or pendant carboxyl groups.

15. A process according to claim 9 wherein the acid is present at 0.1 to 10 mole percent of the polymer.

16. A process according to claim 9 wherein the fugitive base is selected from the group consisting of: ammonia, morpholine, diethanolamine, and amino alcohols.

17. A process according to claim 9 wherein the fugitive base is present at a level so that less than ten percent of the acid groups on the polymer are not blocked.

* * * * *